United States Patent
Hsu et al.

(10) Patent No.: US 7,376,791 B2
(45) Date of Patent: May 20, 2008

(54) MEMORY ACCESS SYSTEMS AND METHODS FOR CONFIGURING WAYS AS CACHE OR DIRECTLY ADDRESSABLE MEMORY

(75) Inventors: Ting-Cheng Hsu, Banchiau (TW); Yen-Yu Lin, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 156 days.

(21) Appl. No.: 11/313,613

(22) Filed: Dec. 20, 2005

(65) Prior Publication Data

US 2006/0230221 A1    Oct. 12, 2006

Related U.S. Application Data

(63) Continuation-in-part of application No. 11/100,134, filed on Apr. 6, 2005, now abandoned.

(51) Int. Cl.
G06F 12/06 (2006.01)

(52) U.S. Cl. ............... 711/128; 711/202; 711/118; 711/129; 711/173; 365/49; 365/230.03

(58) Field of Classification Search .............. None
See application file for complete search history.

(56) References Cited

U.S. PATENT DOCUMENTS

| | | | | |
|---|---|---|---|---|
| 5,226,009 A | | 7/1993 | Arimoto | 365/189.04 |
| 5,410,669 A | * | 4/1995 | Biggs et al. | 711/118 |
| 5,586,293 A | | 12/1996 | Baron et al. | 395/445 |
| 6,317,351 B2 | | 11/2001 | Choi et al. | 365/49 |
| 6,442,667 B1 | * | 8/2002 | Shiell et al. | 711/207 |
| 6,446,181 B1 | | 9/2002 | Ramagopal et al. | 711/168 |
| 6,606,686 B1 | | 8/2003 | Agarwala et al. | 711/129 |
| 6,678,790 B1 | | 1/2004 | Kumar | 711/118 |
| 6,973,557 B2 | * | 12/2005 | Thatipelli et al. | 711/202 |

FOREIGN PATENT DOCUMENTS

TW          00463089          11/2001

OTHER PUBLICATIONS

"ADSP-BF531/ADSP-BF532/ADSP-BF533" Analog Devices; 2005.

* cited by examiner

*Primary Examiner*—Donald Sparks
*Assistant Examiner*—Alan M Otto
(74) *Attorney, Agent, or Firm*—Thomas, Kayden, Horstemeyer & Risley

(57) ABSTRACT

A memory system is described. A processor provides a data access address, and selectively configures a selected number of the ways of a memory device as cache memory belonging to a cacheable region, and configures remaining ways as directly addressable memory belonging to a directly addressable region by the memory configuration information stored in control registers. A cache hit detection circuit includes an address register storing the data access address, tag memories storing tag data of the data access address, a data processing device selectively outputting the tag data or an adjusted tag data as processed data according to a direct address signal, and address comparators each comparing the processed data with portion bits of the data access address from the address register, and outputting an address match signal as comparison match. The tag data is adjusted to a predetermined address by the data processing device, which is the highest address of memory space of the processor.

26 Claims, 17 Drawing Sheets

| cache_size[1:0] | Way #0 | Way #1 | Way #2 | Way #3 |
|---|---|---|---|---|
| 00 | DAM | DAM | DAM | DAM |
| 01 | DAM | DAM | DAM | Cache |
| 10 | DAM | DAM | Cache | Cache |
| 11 | Cache | Cache | Cache | Cache |

| cache_size[1:0] | Way #0 | Way #1 | Way #2 | Way #3 |
|---|---|---|---|---|
| 00 | DAM | DAM | DAM | DAM |
| 01 | DAM | DAM | DAM | Cache |
| 10 | DAM | DAM | Cache | Cache |
| 11 | Cache | Cache | Cache | Cache |

| cache_size[3:0] | Way #0 | Way #1 | Way #2 | Way #3 |
|---|---|---|---|---|
| 0000 | DAM | DAM | DAM | DAM |
| 1000 | DAM | DAM | DAM | Cache |
| 1100 | DAM | DAM | Cache | Cache |
| 1111 | Cache | Cache | Cache | Cache |

FIG. 10

MEMORY ACCESS SYSTEMS AND METHODS FOR CONFIGURING WAYS AS CACHE OR DIRECTLY ADDRESSABLE MEMORY

CROSS REFERENCE TO RELATED APPLICATIONS

This application is a Continuation-In-Part of U.S. patent application Ser. No. 11/100,134, filed Apr. 6, 2005 now abandoned, entitled "systems and methods for memory access".

BACKGROUND OF THE INVENTION

1. Field of the Invention

The disclosure relates in general to systems and methods for memory access. In particular, the disclosure relates to memory access in a configurable memory system.

2. Description of the Related Art

A modern microprocessor system usually comprises a memory system to fulfill CPU memory requests. Conventional memory systems only have fixed functionality, such as directly addressable memory (DAM) to provide a fast and deterministic access time, or cache to provide a local copy of external, off chip memory.

When complexity of the microprocessor system is low, the fixed functionality of the memory system can be designed or planned in the early stage of the design cycle to satisfy functional requirements. However, with increased complexity of microprocessor system, the fixed architecture is not only inflexible but also fails to meet system requirements. Thus, a configurable memory system with combined functionality is utilized to conquer the problem. If the performance of the microprocessor system depends largely on real-time response, the memory system can be configured as more DAM than cache. Otherwise, if the microprocessor system has good spatial and temporal locality in memory access, the memory system can be configured as more cache than DAM.

FIG. 1 shows a conventional circuit controlling selection of cache or directly addressable memory as disclosed in U.S. Pat. No. 6,606,686 to Agarwala, et al.

A memory device comprises 128 sets of 4 ways each and a cache entry size of 128 bytes. Each set, such as set Si 114, includes four cache entries 126, 136, 146 and 156. Each cache entry has a corresponding set of address tag bits and control bits. In FIG. 1, address tag bits 120 and control bits 123 correspond to cache entry 126, address tag bits 130 and control bits 133 correspond to cache entry 136, address tag bits 140 and control bits 143 correspond to cache entry 146, and address tag bits 150 and control bits 153 correspond to cache entry 156.

Each of the address tag bits 120, 130, 140 and 150 has a corresponding address comparison circuit 121, 131, 141 and 151. The address comparison circuits 121, 131, 141 and 151 compare the most significant bits 113 of address 110 with the corresponding address tag bits 120, 130, 140 and 150. Address tag bits 120, 130, 140 and 150 are loaded with the most significant bits of the address of the data cached in the corresponding cache entries 126, 136, 146 and 156. If one of the address comparison circuits 121, 131, 141 or 151 finds a match, this indicates a cache hit, thus AND gates 122, 132, 142 and 152 pass the match signal and indicate the cache hit. Data corresponding to the address to be accessed is stored in the corresponding cache entry 126, 136, 146 or 156. The memory device is then enabled to access data stored in the corresponding cache entry. Thus, the central processing unit can access data for read or write without requiring data transfer to or from the main memory.

In addition, the memory device may be configured as directly addressable memory on the basis of cache ways. Consider the example of one cache way of four configured as directly addressable memory. The cache entry 126 is configured as directly addressable memory, and therefore, AND gate 122 is blocked from passing the match signal from address compare circuit 121 indicating a cache hit due to the 1 on its inverting input while AND gates 132, 142 and 152 are enabled to pass a match signal indicating a cache hit from respective address compare circuits 131, 141 and 151. Accordingly, cache entry 126 is never accessed as cache because the corresponding address tag bits 120 can never generate a cache hit signal. Zero detect circuit 115 and bank select circuit 116 may enable selection of cache entry 126. If middle bits 112 select set Si 114, bits 14 and 15 enable access to cache entry 126 if they are "00", bank select circuit 116 is enabled. In this example, bank select circuit 116 enables cache entry 126. Then the least significant bits 111 point to one byte of the 128 bytes within cache entry 126. Thus, the address selects a physical location within the memory device corresponding to the received address.

However, there are often several memory ways in the configurable memory system. Since the function of each way varies in different modes, it may be accessed in one mode rather than others. In FIG. 1, address comparison circuits 121, 131, 141 and 151 respectively compare address tag bits 120, 130, 140 and 150 even when a part of the memory device, the cache entry 126, is configured as DAM. Although the comparison result is blocked by AND gates 122 without influencing circuit operation, power consumption is caused by unnecessary comparison.

In addition, as the memory device is configured as cache, the setting of the control registers may be altered during runtime, resulting in control registers differencing between in the memory access cycle and tag comparison cycle. This may cause wrong cache hit detection and the following cache fill operations error.

BRIEF SUMMARY OF INVENTION

A memory system is provided. The memory system comprises: a processor providing a data access address; a set of control registers coupled to the processor, storing memory configuration information; a memory device comprising a plurality of entries organized by a first predetermined number of ways, wherein the processor selectively configuring a selected number less than or equal to the first predetermined number of the ways as cache memory belonging to a cacheable region, and configuring remaining ways as directly addressable memory belonging to a directly addressable region by the memory configuration information in the set of control registers; and a memory controller coupled between the processor and the memory device, determining the data access address corresponding to the cacheable region or the directly addressable region, selecting only the way in the directly addressable region corresponding to the data access address when the data access address corresponds to the directly addressable region, selecting only the way(s) belonging to the cacheable region when the data access address corresponds to the cacheable region, and having a cache hit detection circuit comprising: an address register storing the data access address; a predetermined number of tag memories corresponding to the memory ways, storing tag data of the data access address provided by the processor; a data processing device selectively outputting the tag data or an adjusted tag data as processed data according to a direct address signal; and a predetermined number of address comparators corresponding to the memory ways and coupled to the data processing device, each of the address comparators comparing the processed data with portion bits of the data access address from the address register, and outputting an address match signal as comparison match, wherein the processor provides the direct address signal indicating that the way is configured as the directly addressable memory, and a cache signal indicating that the way is configured as cache, and wherein the tag data is adjusted to a predetermined address by the data processing device, which is the highest address of memory space of the processor.

A memory access method is provided. The memory access method for accessing a memory device comprising a plurality of entries organized by a first predetermined number of ways, comprises: providing a data access address, and memory configuration information; selectively configuring a selected number less than or equal to the first predetermined number of the ways as cache memory belonging to a cacheable region, and configuring remaining ways as directly addressable memory belonging to a directly addressable region by the memory configuration information; determining the data access address corresponding to the cacheable region or the directly addressable region, selecting only the way in the directly addressable region corresponding to the data access address when the data access address corresponds to the directly addressable region, and selecting only the way(s) belonging to the cacheable region when the data access address corresponds to the cacheable region; providing a direct address signal indicating that the way is configured as the directly addressable memory, and a cache signal indicating that the way is configured as cache; storing the data access address; storing tag data of the data access address; selectively outputting the tag data or an adjusted tag data as processed data according to the direct address signal; and comparing the processed data with portion bits of the data access address, and outputting an address match signal as comparison match, wherein the adjusted tag data is a predetermined address, which is the highest address of memory space of the processor.

A detailed description is given in the following embodiments with reference to the accompanying drawings.

BRIEF DESCRIPTION OF DRAWINGS

The invention will become more fully understood from the detailed description, given hereinbelow, and the accompanying drawings. The drawings and description are provided for purposes of illustration only and, thus, are not intended to be limiting of the present invention.

FIG. 10 is a table illustrating the modes of the memory ways in response to cache_size according to another embodiment of the invention.

DETAILED DESCRIPTION OF INVENTION

Figure 1:
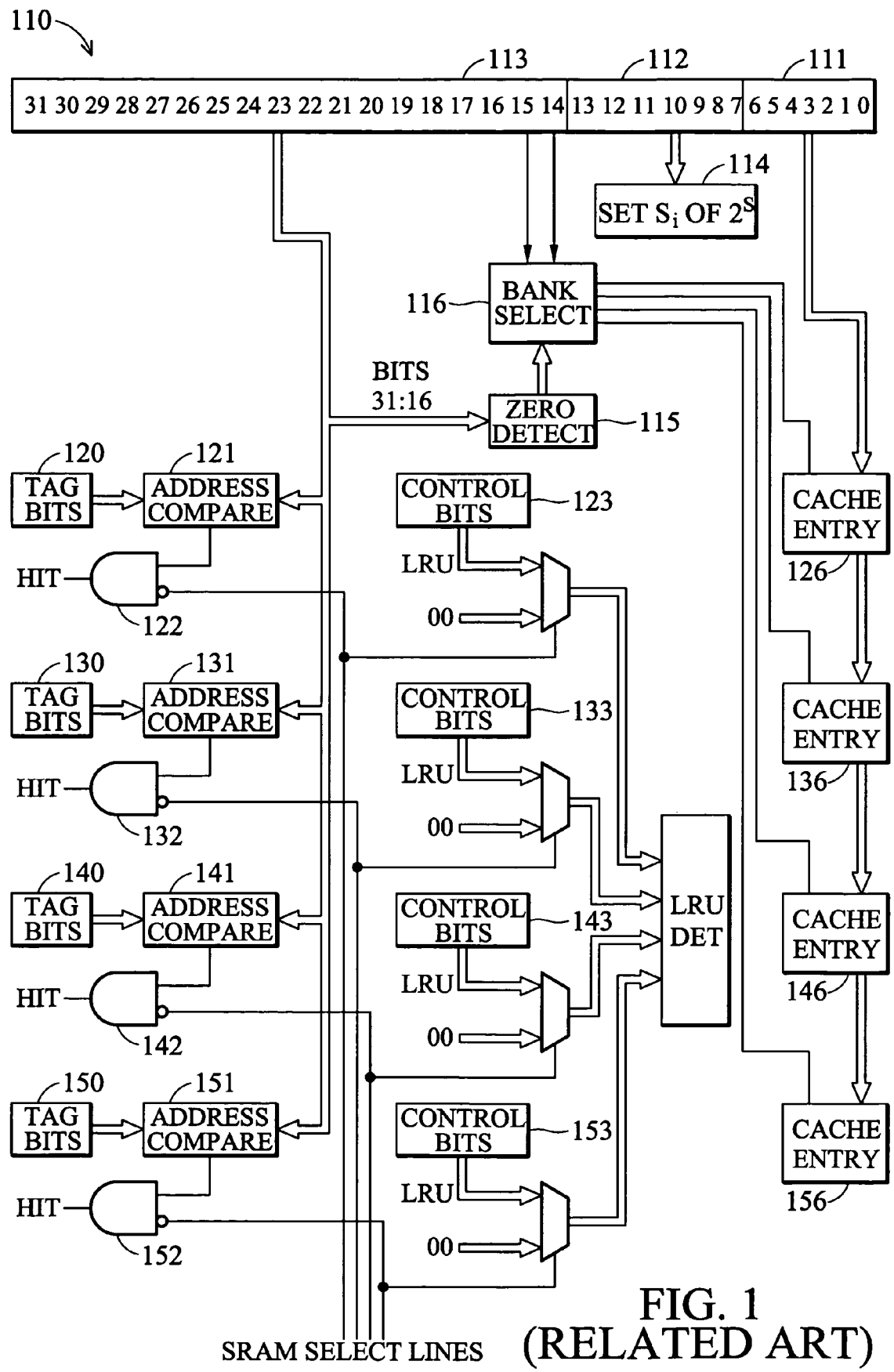
FIG. 1 shows a conventional circuit for controlling the selection of cache or directly addressable memory.
Figure 2:
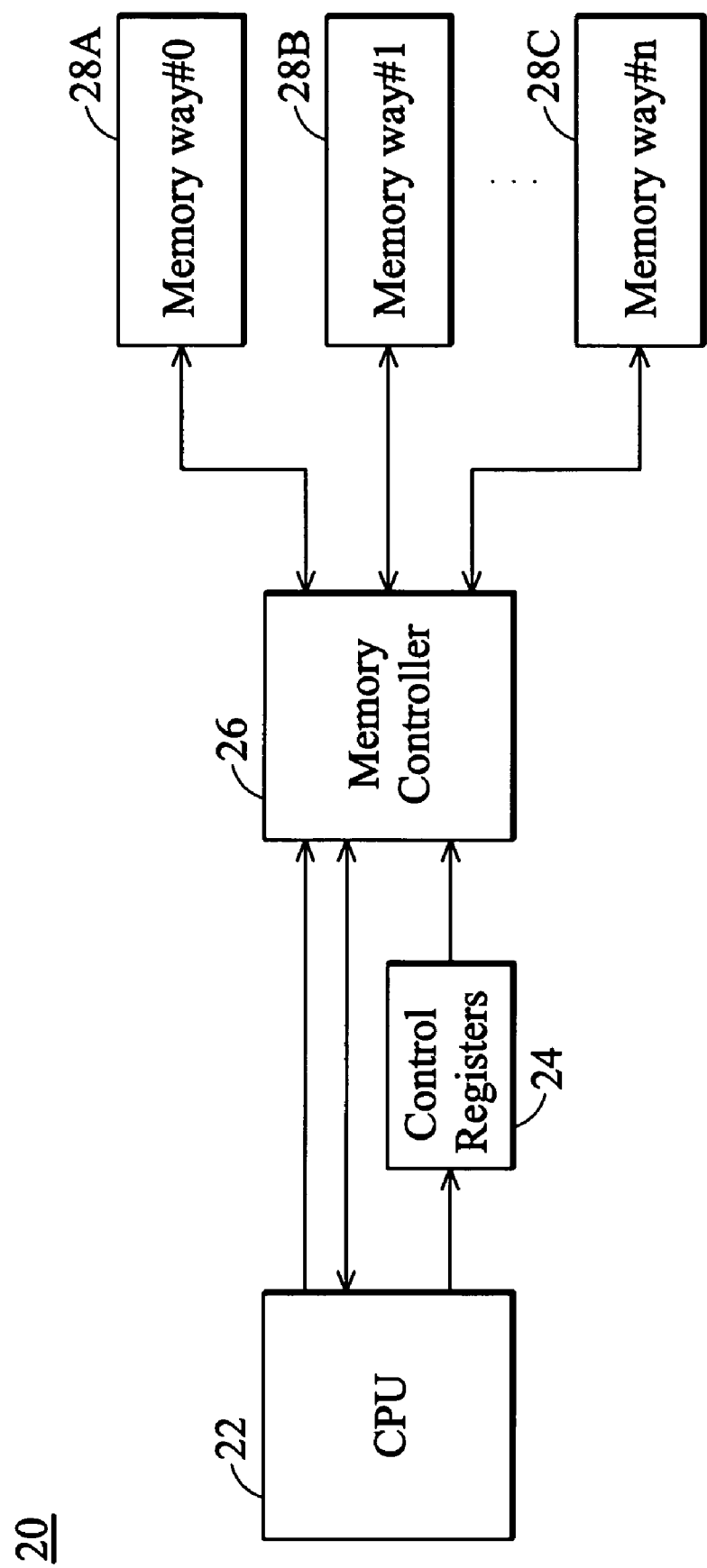
FIG. 2 is a block diagram of memory system 20.

FIG. 2 is a block diagram of memory system 20, comprising central processing unit (CPU) 22, a set of control registers 24, memory controller 26, and a memory device comprising multiple memory ways 28A~28C. Microprocessor 22 changes values of control registers to configure the modes of memory ways 28A~28C.

Figures 3, 4:
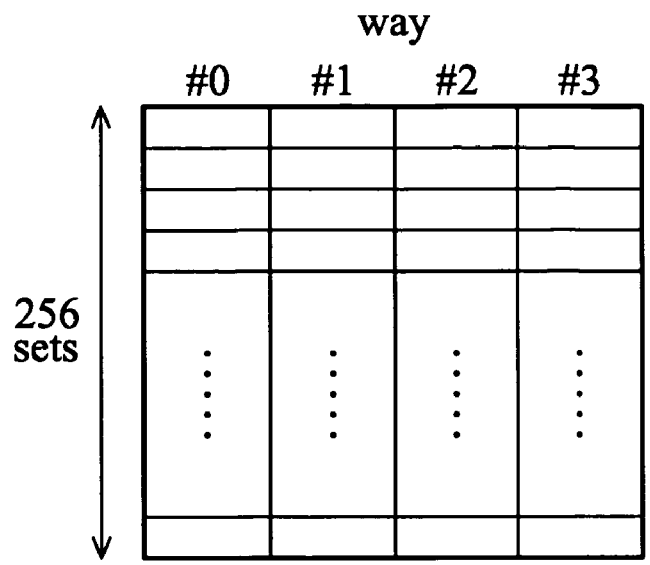
FIG. 3 illustrates the organization of a typical memory device.
FIG. 4 is a table illustrating the modes of the memory ways in response to the cache_size.

FIG. 3 illustrates the organization of a typical memory device. Each way of the memory device is 8 KB in size. When the memory device is configured as cache, the line size (size of each entry in each way) is 32 bytes. Thus, there are a total of 256 sets (8 KB/32=256). The control registers (cache_size) have four different values, summarized in FIG. 4. As cache_size [1:0] is "00", way#0~way#3 of the memory device are all configured as DAM, as cache_size [1:0] is "01", way#0~way#2 are configured as DAM, and way#3 is configured as cache, as cache_size [1:0] is "10", way#0~way#1 are configured as DAM, and way#2~way#3 are configured as cache, and as cache_size [1:0] is "11", way#0~way#3 of the memory device are all configured as cache. In addition, the microprocessor 22 may provide a direct address signal indicating the way being configured as the directly addressable memory through SRAM select lines.

Figure 5:
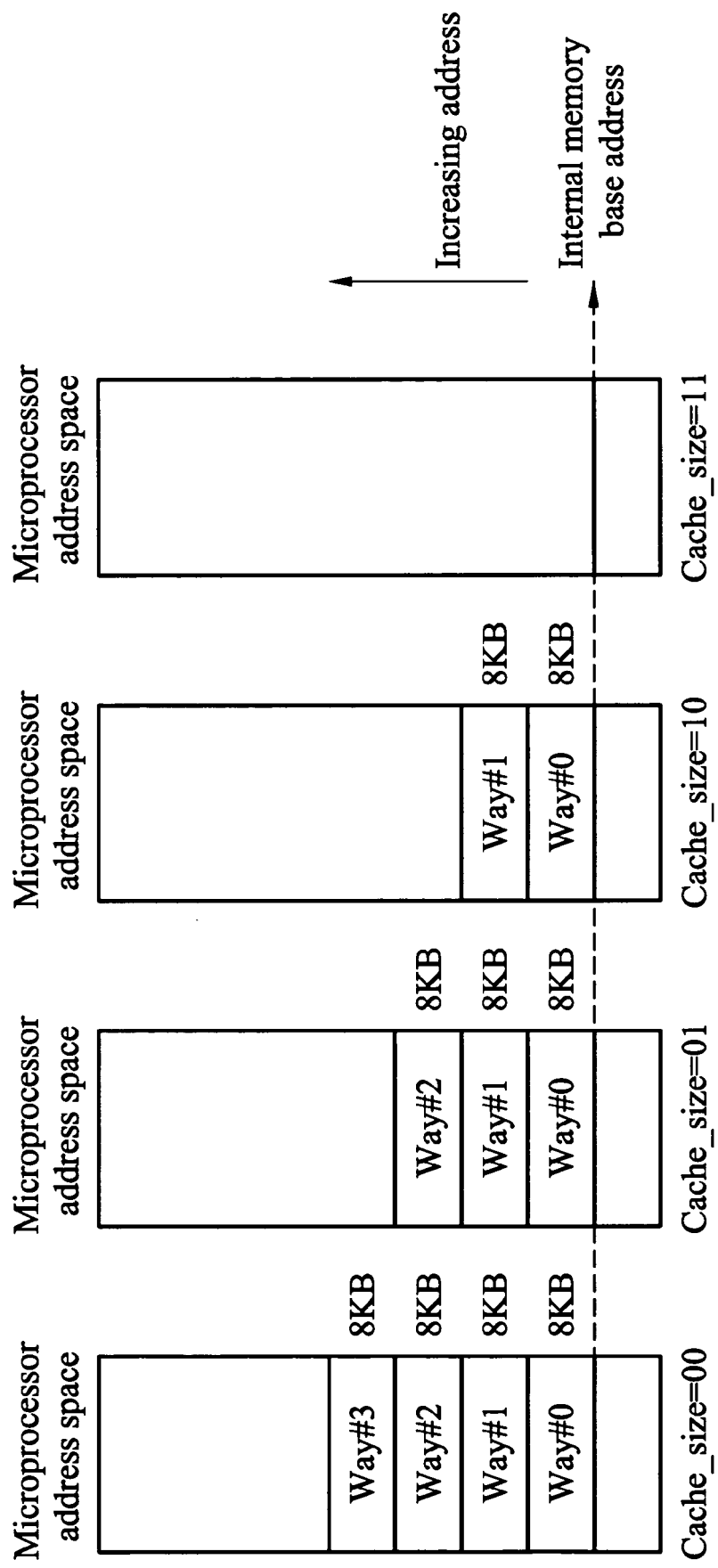
FIG. 5 shows the microprocessor address space in different modes according to an embodiment of the invention.

FIG. 5 shows the microprocessor address space in different modes according to an embodiment of the invention. Because of the continuity in address space, the memory controller can easily use few address bits to distinguish which way is accessed. Since the conditions accessing each way are different, an embodiment of memory access is provided for each way to meet individual requirements.

Figure 6:
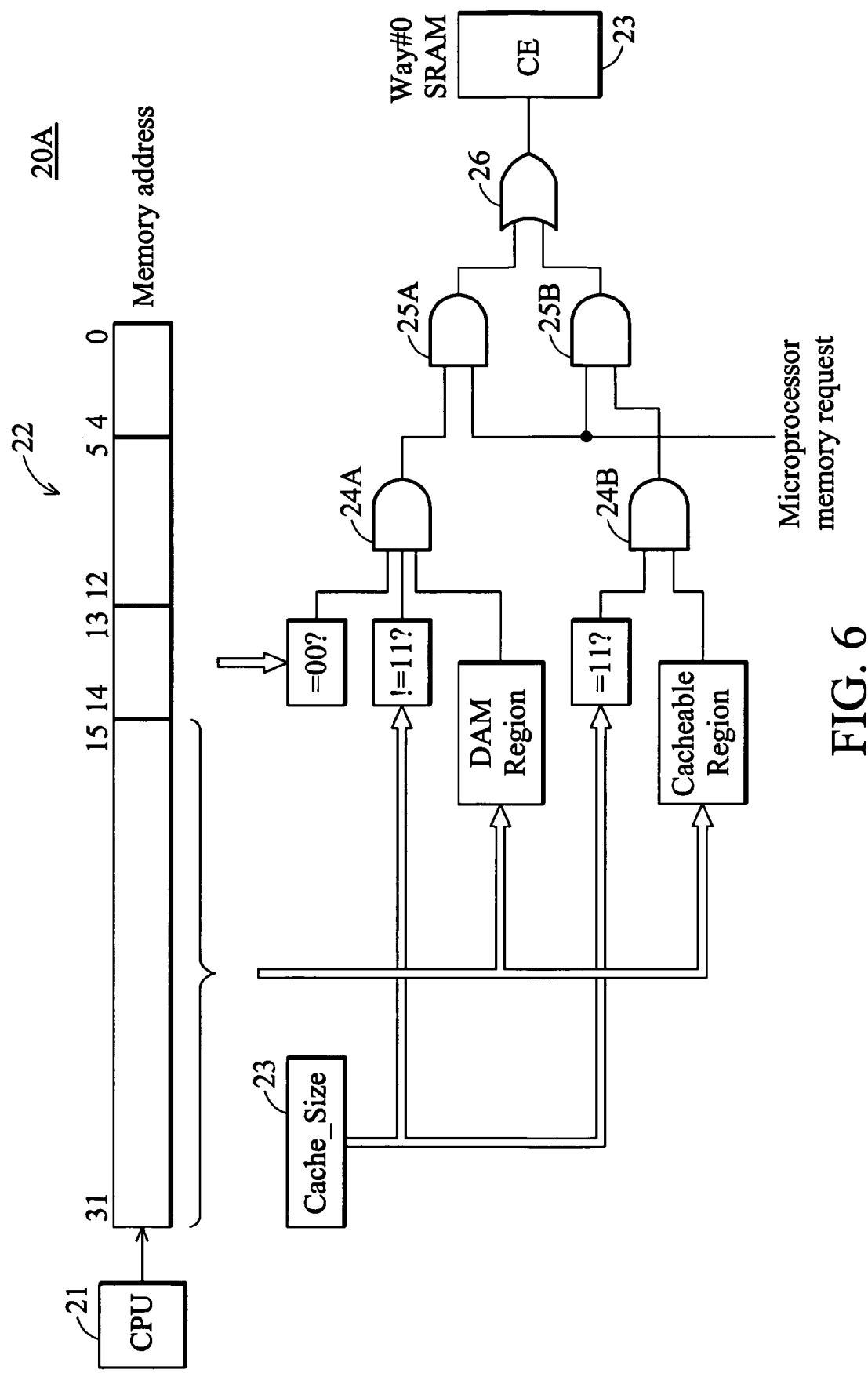
FIG. 6 shows control circuit 20A for way#0 of a memory device according to an embodiment of the invention.

FIG. 6 shows control circuit 20A for way#0 in the memory controller 26 according to an embodiment of the invention. A 32 bit address 22 is provided by CPU 21 to accessed data in the memory device 23, wherein bit value [14:13] indicates the way accessed, for example, "00" indicates access way#0, "01" indicates access way#1, "10" indicates access way#2, and "11" indicates access way#3. In addition, CPU 21 also provides a microprocessor memory request to enable control circuit 20A during access.

Control register (cache_size) 23 stores memory configuration information as described in FIG. 3. The memory configuration information comprises encoded values indicating each way of the memory device corresponding to the directly addressable region or the cacheable region. Since the memory device comprises a plurality of entries organized by a first predetermined number of sets for each way, and a second predetermined number of ways, the memory device can be selectively configured as a selected number less than the second predetermined number of the ways as cache memory belonging to a cacheable region, and configuring remaining ways as directly addressable memory belonging to a directly addressable region according to data stored in control register 23. For example, as cache_size [1:0] is "00", way#0~way#3 of the memory device are all configured as DAM, as cache_size [1:0] is "01", way#0~way#2 are configured as DAM, and way#3 is configured as cache, as cache_size [1:0] is "10", way#0~way#1 are configured as DAM, and way#2~way#3 are configured as cache, and as cache_size [1:0] is "11", way#0~way#3 of the memory device are all configured as cache.

Control circuit 20A determines that the data access address 22 for way#0 corresponds to the cacheable region or the directly addressable region. In an embodiment, control circuit 20A ascertains that way#0 is configured as cache or DAM according to the bit value [31:15] of data access address 22. In addition, according to FIG. 4, if cache_size [1:0] is not "11", thus the memory request address 22 falls into the range of DAM, and if cache_size[1:0] is "11", within a predefined cacheable region.

If bit value [31:15] of data access address 22 corresponds to DAM region, bit value [14:13] of data access address 22 is "00", and cache_size[1:0] is not "11", AND gate 24A outputs a high logic level signal. If AND gate 25A receives the high logic level signal output by AND gate 24A and the high logic level microprocessor memory requests output by CPU 21, AND gate 25A outputs a high logic level signal to select way#0 through OR gate 26 as the destination SRAM and its chip enablement (CE) is asserted by complying with the microprocessor memory request.

If bit value [31:15] of data access address corresponds to cacheable region, and cache_size[1:0] is "11", AND gate 24B outputs a high logic level signal. If AND gate 25B receives the high logic level signal output by AND gate 24B and the high logic level microprocessor memory request output by CPU 21, AND gate 25B outputs a high logic level signal through OR gate 26. Thus, way#0 must be read to determine whether the data requested by CPU is present. Therefore, after complying with microprocessor memory requests, the control circuit 20A asserts CE of way#0 SRAM.

Since these two scenarios will not occur at the same time, the final chip enablement signal of way#0 SRAM can be generated by chip enablement signals output by OR gate 26 in two different modes.

Figure 7:
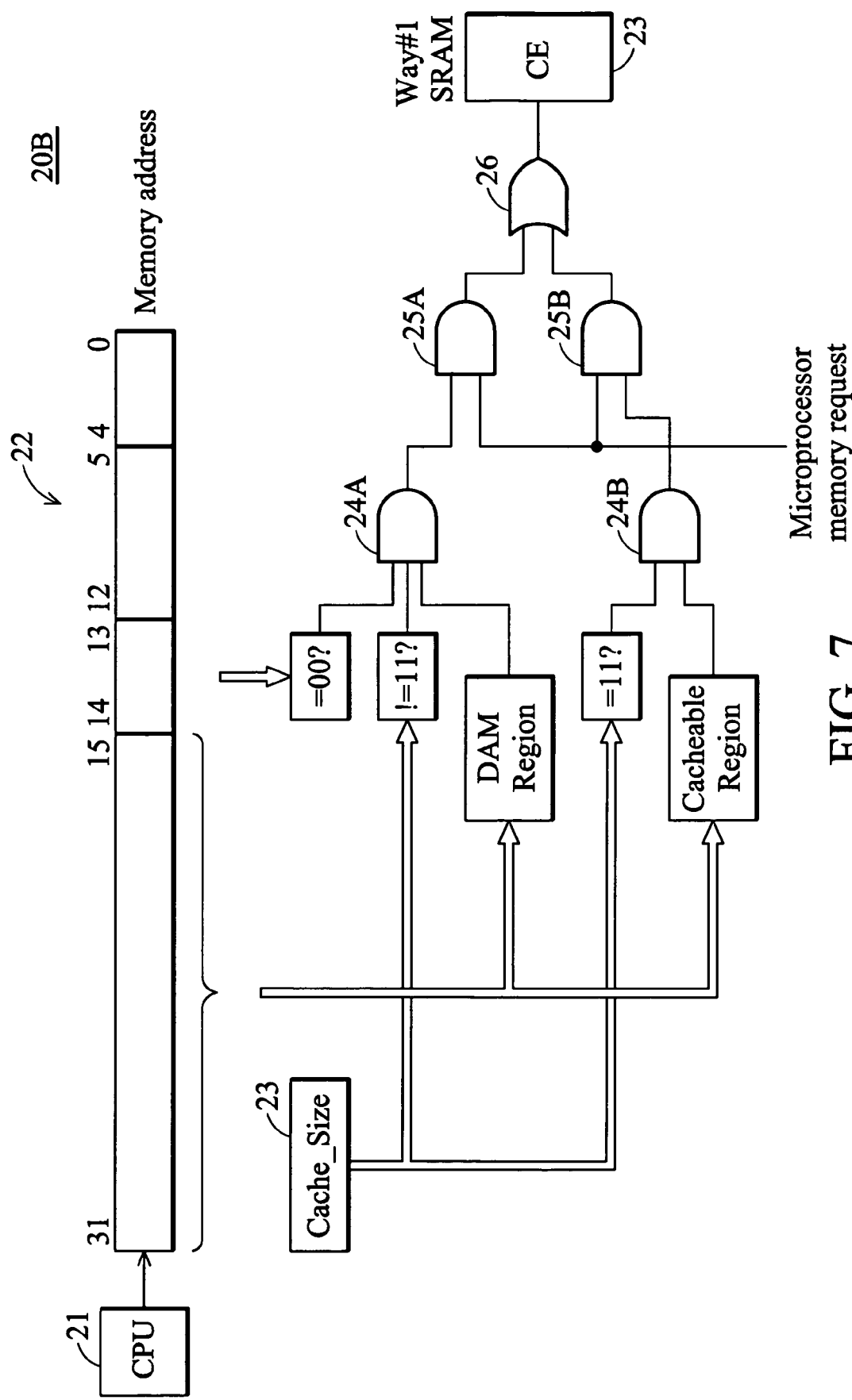
FIG. 7 shows control circuit 20B for way#1 of a memory device according to an embodiment of the invention.

FIG. 7 shows control circuit 20B for way#1 in the memory controller 26 according to an embodiment of the invention. Control circuit 20B determines that the data access address 22 for way#1 corresponds to the cacheable region or the directly addressable region. In an embodiment, control circuit 20B ascertains that way#1 is configured as cache or DAM according to the bit value [31:15] of data access address 22. In addition, according to FIG. 4, if cache_size[1:0] is not "11", thus the memory request address 22 falls into the range of DAM, and if cache_size [1:0] is "11", within a predefined cacheable region.

If bit value [31:15] of data access address 22 corresponds to DAM region, bit value [14:13] of data access address 22 is "01", and cache_size[1:0] is not "11", AND gate 24A outputs a high logic level signal. If AND gate 25A receives the high logic level signal output by AND gate 24A and the high logic level microprocessor memory request output by CPU 21, AND gate 25A outputs a high logic level signal to select way#1 through OR gate 26 as the destination SRAM and its chip enablement (CE) is asserted by complying with the microprocessor memory request.

If bit value [31:15] of data access address corresponds to cacheable region, and cache_size[1:0] is "11", AND gate 24B outputs a high logic level signal. If AND gate 25B receives the high logic level signal output by AND gate 24B and the high logic level microprocessor memory request output by CPU 21, AND gate 25B outputs a high logic level signal through OR gate 26. Thus, way#1 must be read to determine whether the data requested by CPU is present. Therefore, after complying with microprocessor memory request, the control circuit 20B asserts CE of way#1 SRAM.

Figure 8:
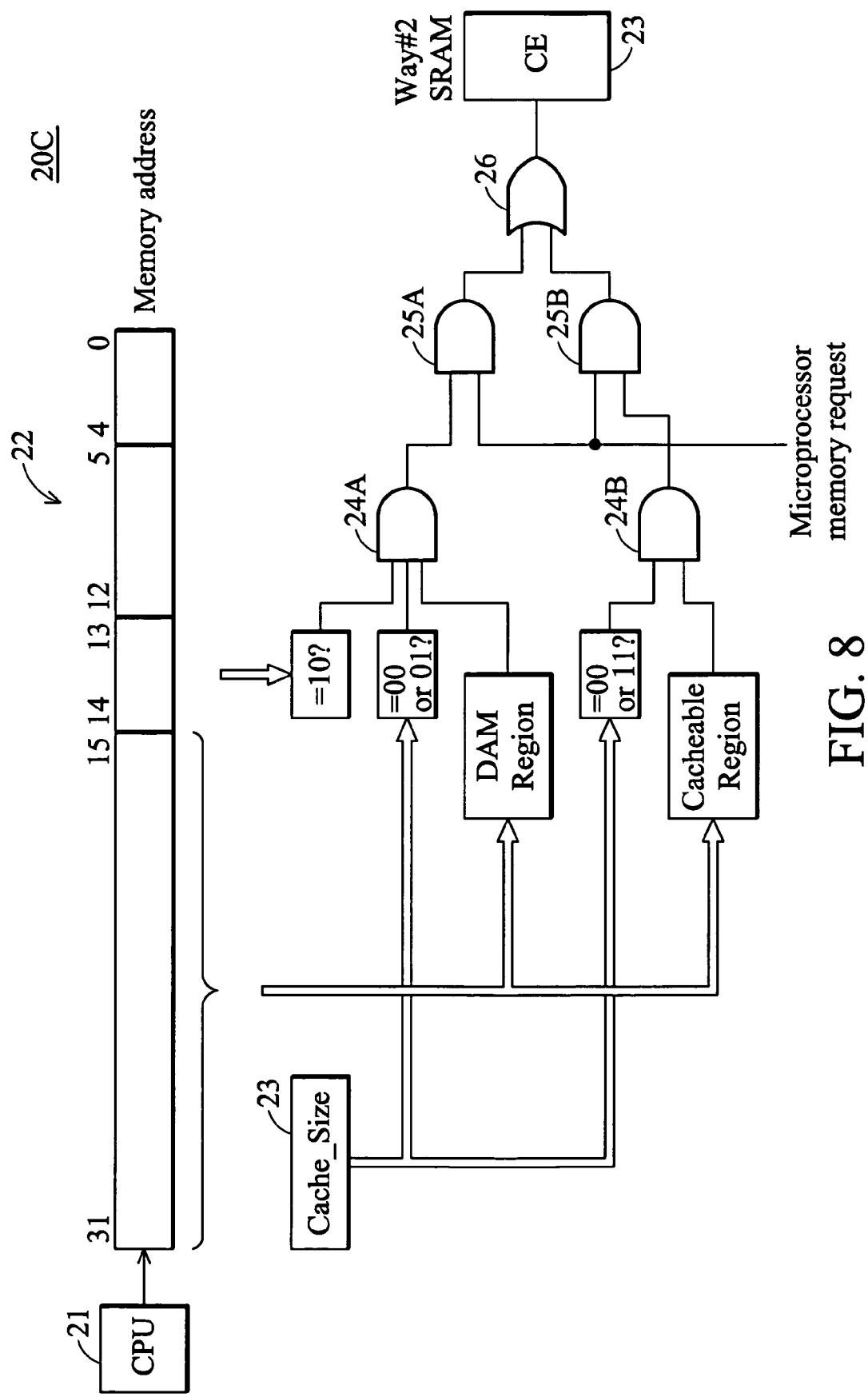
FIG. 8 shows control circuit 20C for way#2 of a memory device according to an embodiment of the invention.

FIG. 8 shows control circuit 20C for way#2 in the memory controller 26 according to an embodiment of the invention. Control circuit 20C determines that the data access address 22 for way#2 corresponds to the cacheable region or the directly addressable region. In an embodiment, control circuit 20C ascertains that way#2 is configured as cache or DAM according to the bit value [31:15] of data access address 22. In addition, according to FIG. 4, if cache_size[1:0] is "00" or "01", thus the memory request address 22 falls into the range of DAM, and if cache_size [1:0] is "10" or "11", within a predefined cacheable region.

If bit value [31:15] of data access address corresponds to DAM region, bit value [14:13] of data access address 22 is "10", and cache_size[1:0] is "00" or "01", AND gate 24A outputs a high logic level signal. If AND gate 25A receives the high logic level signal output by AND gate 24A and the high logic level microprocessor memory request output by CPU 21, AND gate 25A outputs a high logic level signal to select way#2 through OR gate 26 as the destination SRAM and its chip enablement (CE) is asserted by complying with the microprocessor memory request.

If bit value [31:15] of data access address corresponds to cacheable region, and cache_size[1:0] is "10" or "11", AND gate 24B outputs a high logic level signal. If AND gate 25B receives the high logic level signal output by AND gate 24B and the high logic level microprocessor memory request output by CPU 21, AND gate 25B outputs a high logic level signal through OR gate 26. Thus, way#2 must be read to determine whether the data requested by CPU is present. Therefore, after complying with microprocessor memory request, the control circuit 20C asserts CE of way#2 SRAM.

Figure 9:
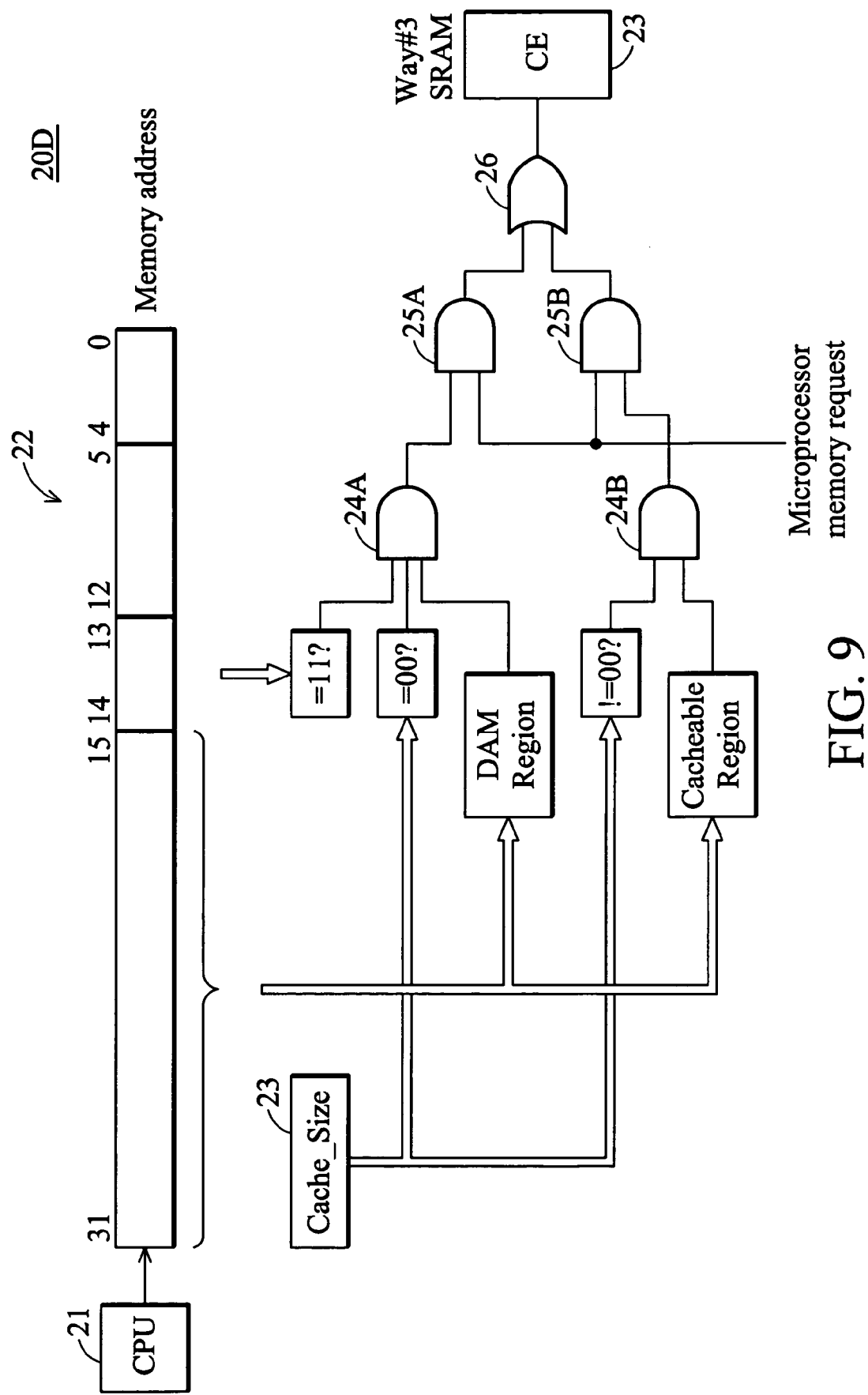
FIG. 9 shows control circuit 20D for way#3 of a memory device according to an embodiment of the invention.

FIG. 9 shows control circuit 20D for way#3 in the memory controller 26 according to an embodiment of the invention. Control circuit 20D determines that the data access address 22 for way#3 corresponds to the cacheable region or the directly addressable region. In an embodiment, control circuit 20D ascertains that way#3 is configured as cache or DAM according to the bit value [31:15] of data access address 22. In addition, according to FIG. 4, if cache_size[1:0] is "00", thus the memory request address 22 falls into the range of DAM, and if cache_size[1:0] is not "00", within a predefined cacheable region.

If bit value [31:15] of data access address corresponds to DAM region, bit value [14:13] of data access address 22 is "11", and cache_size[1:0] is "00", AND gate 24A outputs a high logic level signal. If AND gate 25A receives the high logic level signal output by AND gate 24A and the high logic level microprocessor memory request output by CPU 21, AND gate 25A outputs a high logic level signal to select way#3 through OR gate 26 as the destination SRAM and its chip enablement (CE) is asserted by complying with the microprocessor memory request.

If bit value [31:15] of data access address corresponds to cacheable region, and cache_size[1:0] is not "00", AND gate 24B outputs a high logic level signal. If AND gate 25B receives the high logic level signal output by AND gate 24B and the high logic level microprocessor memory request output by CPU 21, AND gate 25B outputs a high logic level signal through OR gate 26. Thus, way#3 must be read to determine whether the data requested by CPU is present. Therefore, after complying with microprocessor memory request, the control circuit 20C asserts CE of way#3 SRAM.

In the embodiments described above, the control circuit for each way in the memory controller 26 selects and turns on only the way in the DAM corresponding to the data access address when the data access address 22 corresponds to the DAM region. In addition, the control circuit for each way in the memory controller 26 selects and turns on only the ways belonging to the cacheable region when the data access address corresponds to the cacheable region. Thus, the different modes of control circuit in the memory controller 26 according to the embodiments guarantee exactly which memory bank is accessed, decreasing power consumption by enabling only the accessed memory banks.

In addition, the memory system 20 comprises an encoder encoding the memory configuration information. Note that the control registers of the embodiments described above are encoded to 2 bits.

In another embodiment, the encoder of memory system 20 can be omitted by extending control registers to N bits, where N is the number of memory ways. Each bit of "0" value denotes corresponding memory way configured as DAM (or cache, depending on the system implementation). If the control register values shown in FIG. 4 are extended from 2 bits to 4 bits, wherein "0" means corresponding memory way is configured as DAM, and "1" means corresponding memory way is configured as cache. The resulting table for this embodiment is shown in FIG. 10, wherein cache_size[3] corresponds to way#3, cache_size[2] corresponds to way#2, cache_size[1] corresponds to way#1, and cache_size[0] corresponds to way#0.

Figure 11:
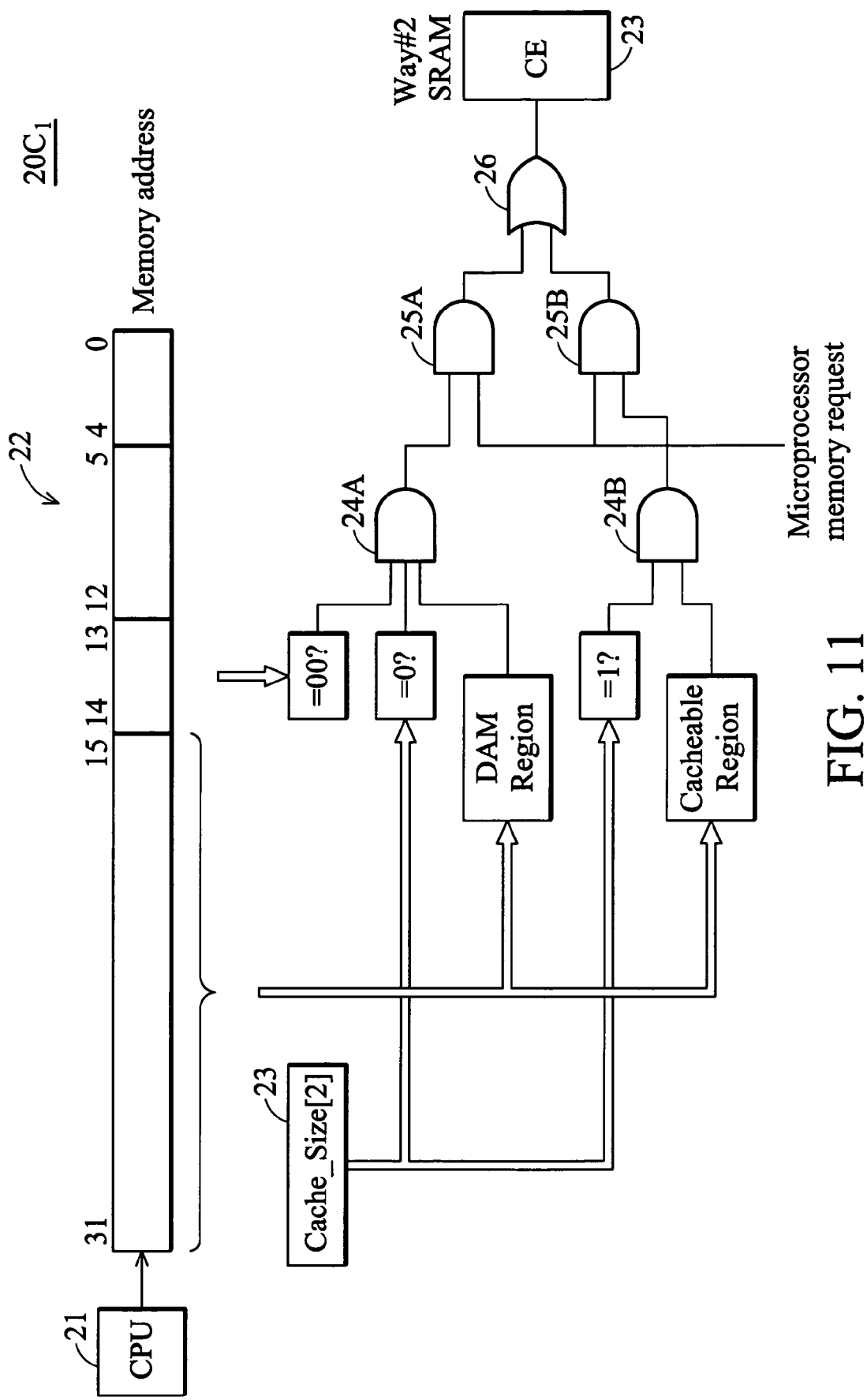
FIG. 11 shows control circuit 20C1 for way#2 of a memory device when the control registers are extended to 4 bits according to an embodiment of the invention.

FIG. 11 shows control circuit $20C_1$ for way#2 of memory device when the control registers are extended to 4 bits according to an embodiment of the invention. Control circuit $20C_1$ determines that the data access address 22 for way#2 corresponds to the cacheable region or the directly addressable region. If bit value [31:15] of data access address corresponds to DAM region, bit value [14:13] of data access address 22 is "10", and cache_size[2] is "0", AND gate 24A outputs a high logic level signal. If AND gate 25A receives the high logic level signal output by AND gate 24A and the high logic level microprocessor memory request output by CPU 21, AND gate 25A outputs a high logic level signal to select way#2 through OR gate 26 as the destination SRAM and its chip enablement (CE) is asserted by complying with the microprocessor memory request.

If bit value [31:15] of data access address corresponds to cacheable region, and cache_size[2] is "1", AND gate 24B outputs a high logic level signal. If AND gate 25B receives the high logic level signal output by AND gate 24B and the high logic level microprocessor memory request output by CPU 21, AND gate 25B outputs a high logic level signal through OR gate 26. Thus, way#2 must be read to determine whether the data requested by CPU is present. Therefore after complying with microprocessor memory request, the control circuit 20C asserts CE of way#2 SRAM. In this embodiment, the encoder is eliminated to simplify circuit design and speed the operation of the control circuit. In addition, the different modes of control circuit for way#0, way#1, and way#3 in the memory controller 26 can be designed using the same implementation.

Since each memory way may be configured as cache, it must be associated with a tag memory and an address comparator. When a particular memory way is used as cache, its tag memory and address comparator is activated, otherwise when the bank is used as DAM, its tag memory and address comparator may be disabled, and the tag comparison result must be masked.

Figure 12:
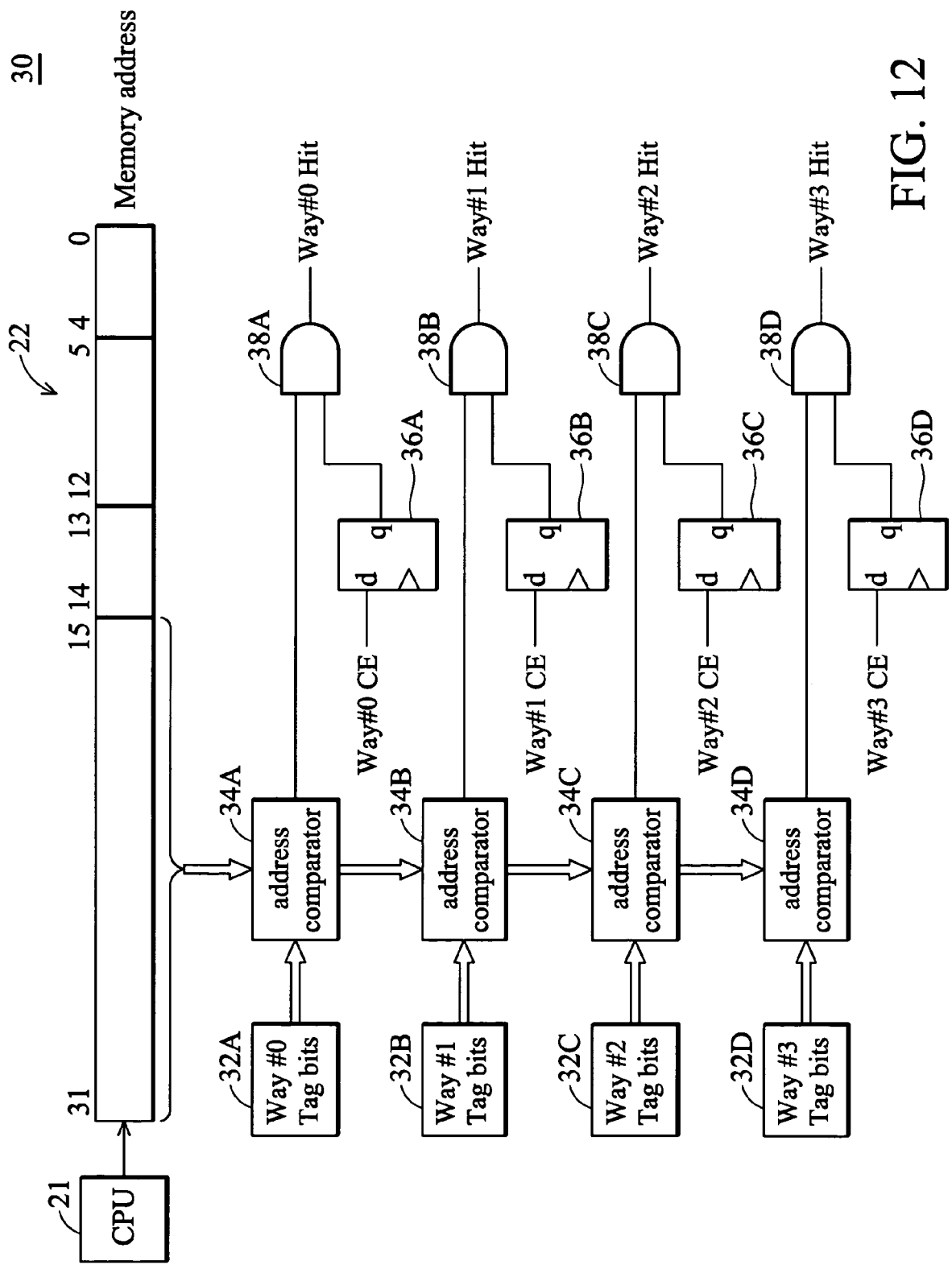
FIG. 12 shows cache hit detection circuit 30 according to an embodiment of the invention.

FIG. 12 shows cache_hit detection circuit 30 in the memory controller 26 according to an embodiment of the invention. The chip enablement signal of each memory way is used as the complying condition of cache hit. Cache_hit detection circuit 30 comprises tag memories 32A~32D, address comparators 34A~34D, flip flops 36A~36D, and AND gates 38A~38D.

Tag memories 32A~32D respectively store the tag data, bit value [31:15] of data access address 22 for example, for each way of the memory device. Each tag memory 32A~32D has a corresponding address comparator 34A~34D.

The tag/cache access takes two cycles to complete. Using Way#0 as an example, the control circuit asserts the chip enablement signal way#0 CE and gives correct address ADDR to the tag memory 32A at first cycle $\phi 1$. At second cycle $\phi 2$, tag data is read from tag memory 32A, and sent to the address comparator 34A for the detection of cache hit.

Figure 13:
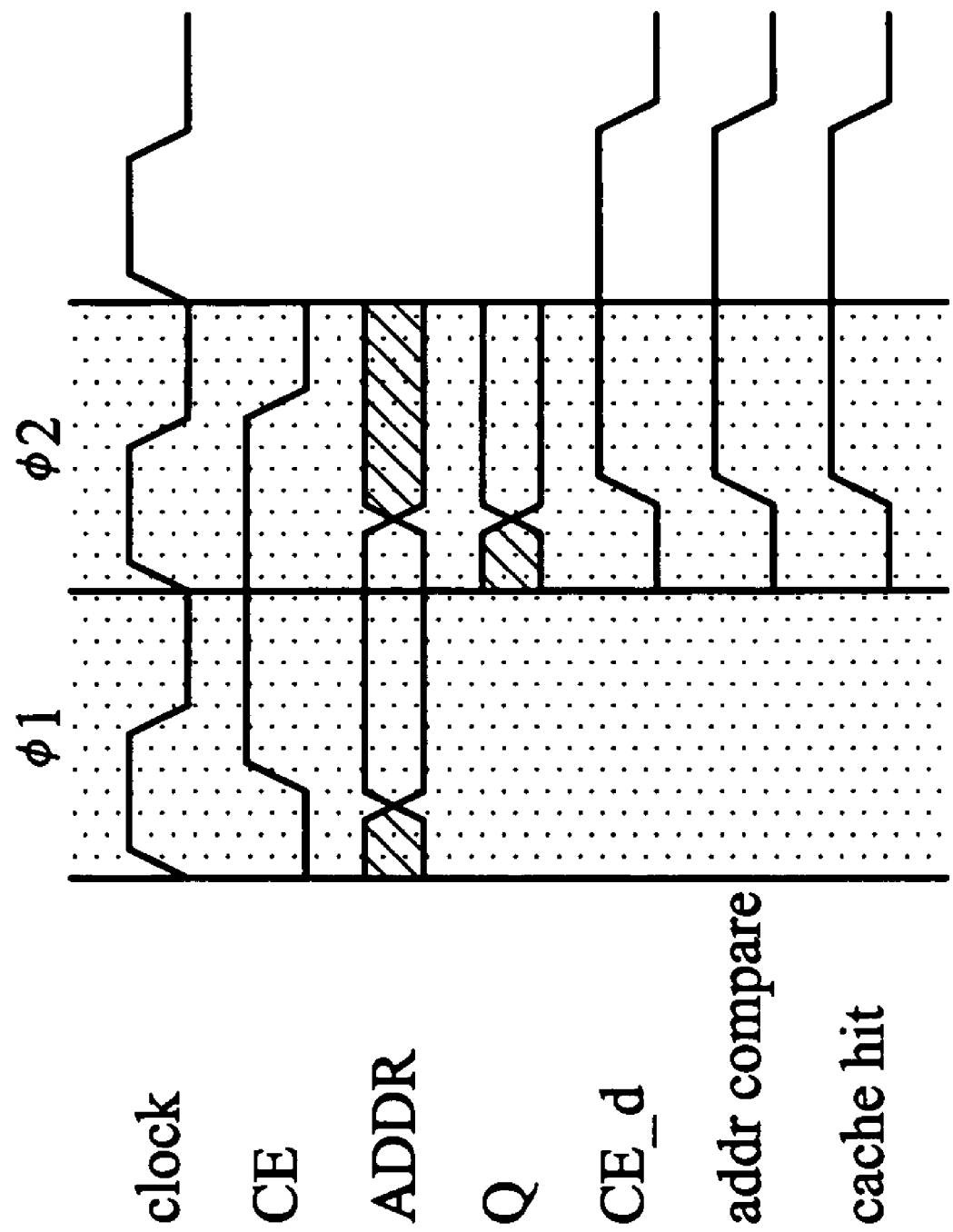
FIG. 13 shows a timing chart of signaling according to an embodiment of the invention.

FIG. 13 is a timing chart of signaling according to an embodiment of the invention. The address comparators 34A~34D compare the bit value [31:15] of data access address 22 with the address corresponding to the tag data associated with corresponding tag bits stored in tag memories 32A~32D. If the tag compares equally, address comparator 34A outputs a high logic level signal, and if the delayed chip enablement signal way#0 CE (CE_d) output by flip flop 36A is a high logic level signal, AND gate 38A outputs a cache hit signal (way#0 hit).

Furthermore, if a particular memory way is configured as DAM, its chip enablement signal will not be asserted when microprocessor issues a memory request in cacheable address region. Therefore in the second cycle its tag comparison result will be masked by the latched chip enablement signal, showing cache not hit in this way.

Figure 14:
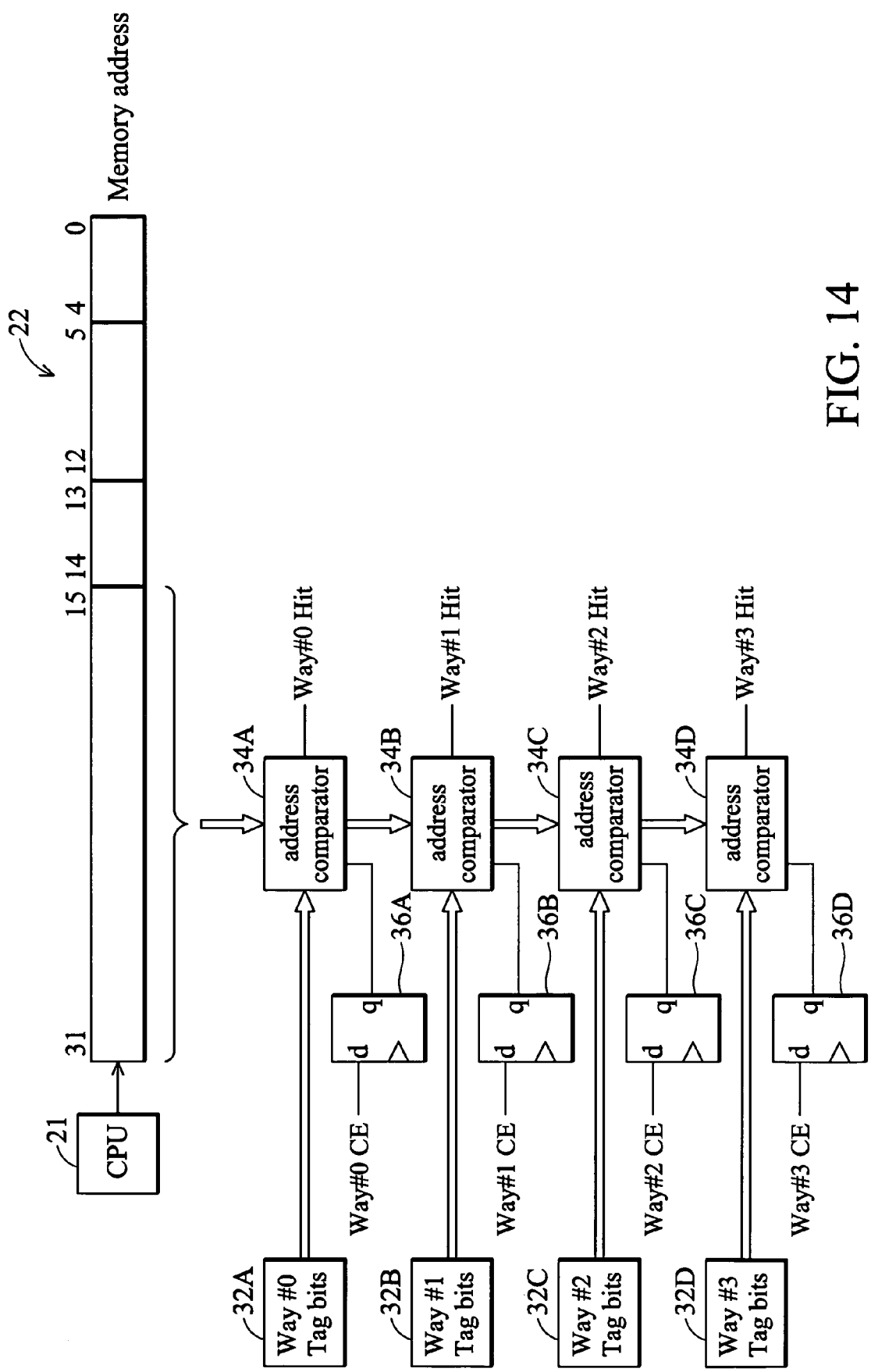
FIG. 14 shows another embodiment of cache hit detection circuit 30.

In another embodiment, address comparators 34A~34D can be respectively enabled by flip flops 36A~36D. FIG. 14 shows another embodiment of cache hit detection circuit 30 in the memory controller 26. As flip flops 36A receives chip enablement signal way#0 CE at first cycle $\phi 1$, the delayed chip enablement signal way#0 CE (CE_d) output by flip flop 36A activates address comparators 34A at second cycle $\phi 2$ for tag comparison. If the comparison matches, address comparator 34A outputs the cache hit signal (way#0 hit).

If flip flops 36A do not receive chip enablement signal way#0 CE at first cycle $\phi 1$, the comparison of address comparators 34A is shut down to further reduce power consumption. Note that address comparator 34A outputs the result as "no match", thus indicate cache "no hit" as desired when address comparator 34A is shut down. Therefore, AND gates 38A~38D shown in FIG. 12 is omitted.

Figure 15A:
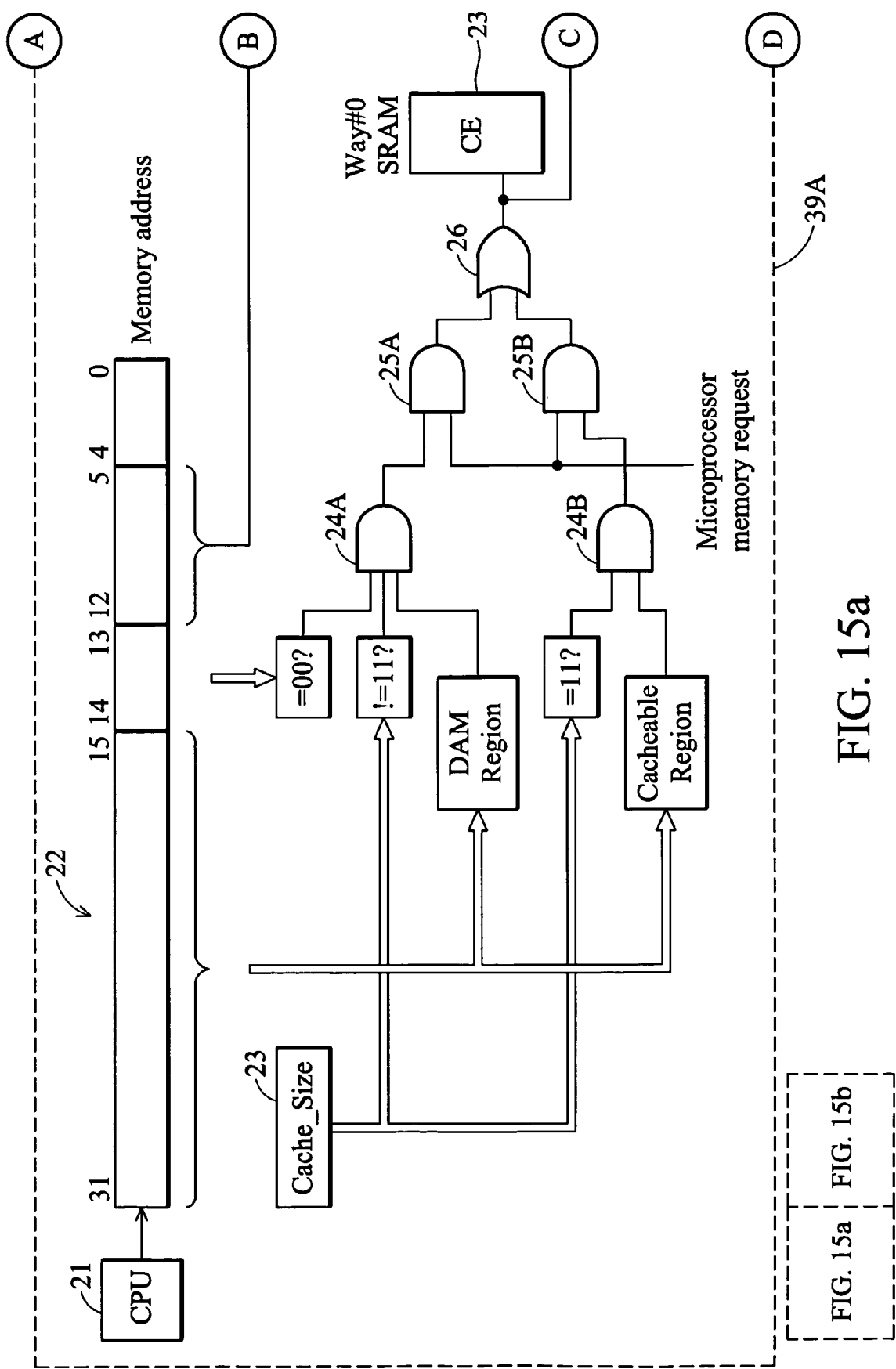
FIGS. 15a and 15b show an embodiment of the control circuit combined with cache hit detection circuit for way#0 of memory device in the memory controller.
Figure 15B:
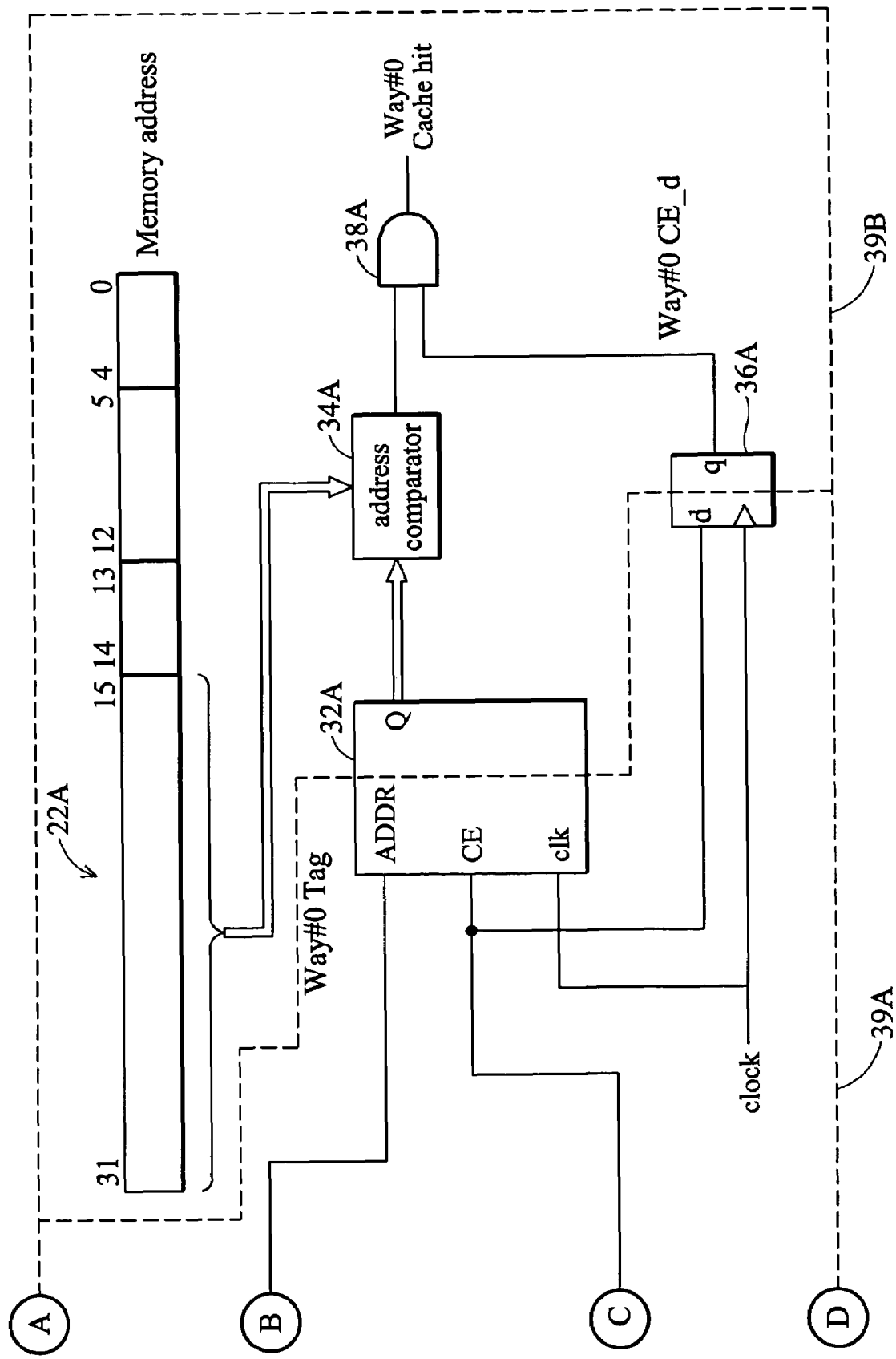

FIGS. 15a and 15b show an embodiment of the control circuit combined with cache_hit detection circuit for way#0 of a memory device in the memory controller 26, wherein the left side labeled 39A operates at first cycle φ1, and the right side labeled by 39B operates at second cycle φ2. As control circuit 20A determines that the data access address 22 for way#0 corresponds to the cacheable region according to the bit value [31:15] of data access address 22, and cache_size[1:0] is "11", AND gate 24B outputs a high logic level signal (chip enablement signal way#0 CE) to activate tag memory 32A at first cycle φ1. Chip enablement signal way#0 CE is also latched by flip flop 36A at first cycle φ1. In addition, an address register stores data access address 22A.

At second cycle φ2, tag data is read from tag memory 32A, and sent to the address comparator 34A for detection of cache hit. The address comparator 34A compares the bit value [31:15] of latched data access address 22A with tag bits stored in tag memory 32A. If the tag compares equally, address comparator 34A outputs a high logic level signal, and if the delayed chip enablement signal way#0 CE (CE_d) output by flip flop 36A is a high logic level signal, AND gate 38A outputs a cache hit signal (way#0 hit).

Figure 16:
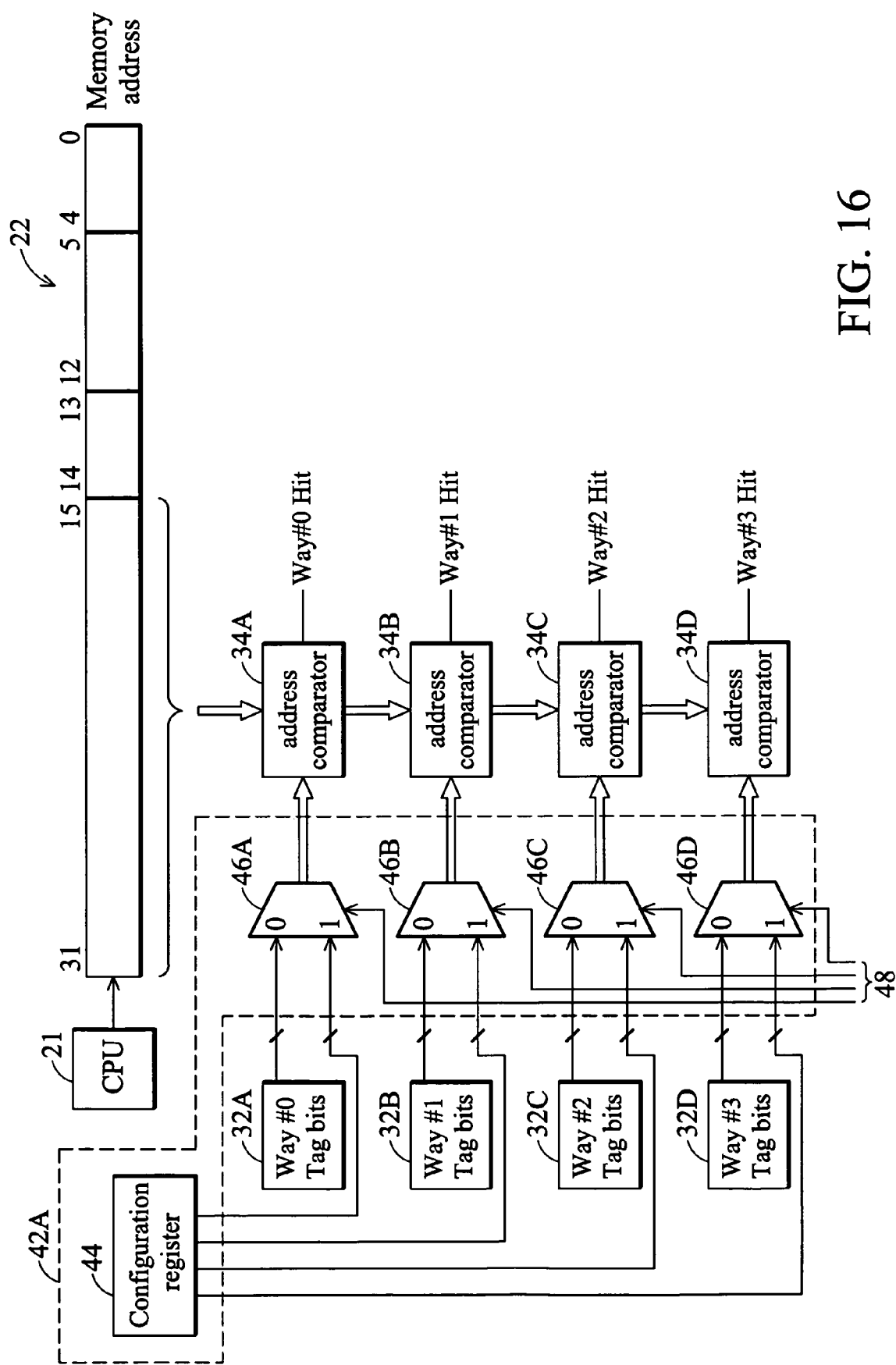
FIG. 16 shows cache_hit detection circuit 40 in the memory controller 26 according to an embodiment of the invention.

FIG. 16 shows cache hit detection circuit 40 in the memory controller 26 according to an embodiment of the invention. Cache_hit detection circuit 40 comprises tag memories 32A~32D, address comparators 34A~34D, and data processing device 42A. Tag memories 32A~32D respectively store the tag data, bit value [31:15] of data access address 22 for example, for each way of the memory device. Each tag memory 32A~32D has a corresponding address comparator 34A~34D.

As mentioned above, for each of the ways, microprocessor 22 may provide a direct address signal indicating the way being configured as the directly addressable memory or provide a cache signal indicating the way being configured as the cache through a SRAM select line 48. The data processing device 42A receives the tag data respectively output from tag memories 32A~32D, and selectively outputs the original tag data or adjusted tag data as processed data according to the direct address signal. For example, when way#0 of the memory device is configured as DAM and way #1-3 as cache, data processing device 42A receives data from tag memories 32A~32D, adjusts the data of tag memory 32A, provides the adjusted data to address comparator 34A corresponding to tag memory 32A, and sends the data received from tag memories 32B~32D to the corresponding address comparators 34B~34D. It is noted that the data can be adjusted to a predetermined address, the address that microprocessor 22 never access in any conditions. One example of the predetermined address is the highest address of a memory space accessed by microprocessor 22, such as 17h'1ffff for 17 bits data.

In FIG. 16, data processing device 42A comprises a configuration register 44 storing the predetermined address, and multiplexers 46A~46D selectively outputting the tag data or the predetermined address as the processed data according to the direct address signal. For example, when way#0 is configured as DAM, SRAM select lines 48 provide direct address signal "1" to multiplexer 46A, and provide cache signals "0" to multiplexers 46B~46D. Thus, multiplexer 46A outputs the predetermined address provided by configuration register 44, rather than the data received from tag memories 32A to address comparators 34A, and multiplexers 46B~46D pass the data received from tag memories 32B~32D to the corresponding address comparators 34B~34D.

Figure 17:
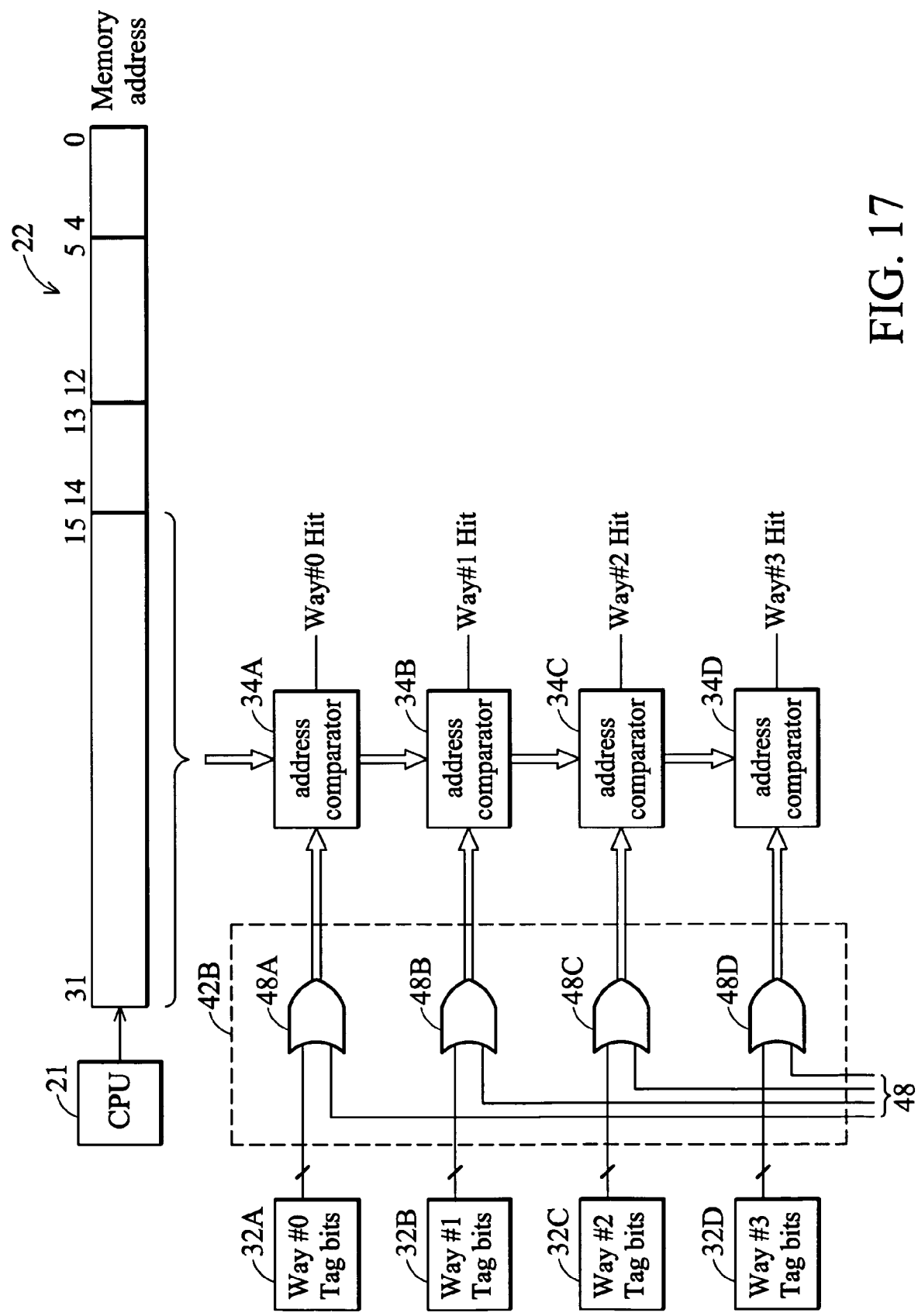
FIG. 17 shows cache_hit detection circuit 50 in the memory controller 26 according to another embodiment of the invention.

FIG. 17 shows cache hit detection circuit 50 in the memory controller 26 according to another embodiment of the invention. Data processing device 42B of Cache_hit detection circuit 50 is different with that of Cache_hit detection circuit 40. In FIG. 17, data processing device 42B comprises a plurality of OR logic gates 48A~48D selectively outputting the tag data or the predetermined address as the processed data according to the direct address signal. For example, when way#0 is configured as DAM, SRAM select lines 48 provide a number of direct address signals "1" to OR logic gate 48A, wherein the number of direct address signals equals to the number of bits of tag data, and provide a number of cache signals "0" to OR logic gates 46B~46D, wherein the number of cache signals equals to the number of bits of tag data. Thus, address comparators 34A receives the highest address of a memory space, which will be never accessed by microprocessor 22, for example, 17h'1ffff for 17 bits data, which is different with the tag data received form from tag memory 32A. OR logic gates 46B~46D bypass pass the tag data received from tag memories 32B~32D to the corresponding address comparators 34B~34D.

Address comparators 34A~34D in FIGS. 16 and 17 compare the bit value [31:15] of data access address 22 with the address corresponding to the tag data associated with corresponding tag bits provided by data processing device 42. If the tag compares equally, address comparator outputs a cache hit signal (way#0 hit~way#3 hit). However, when the data provided to address comparators 34A corresponding to way#0 is adjusted by data processing devices 42A and 42B, cache hit signal is never generated by address comparators 34A since the adjusted address, for example, 17h'1ffff for 17 bits data, is an address never being accessed by the microprocessor 22 in any conditions. According to the invention, systems and methods to access a configurable memory system minimize memory power consumption when CPU makes a memory request. If CPU needs data in DAM, the smallest way of memory containing the data is selected only. If CPU accesses data in the cacheable region, only memory ways configured as cache are activated to find the data, and other banks configured as DAM remain turned off to save power.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A memory system, comprising:
   a processor providing a data access address;
   a set of control registers coupled to the processor, storing memory configuration information;
   a memory device comprising a plurality of entries organized by a first predetermined number of ways, wherein the processor selectively configuring a selected number less than or equal to the first predetermined number of the ways as cache memory belonging to a cacheable region, and configuring remaining ways as directly addressable memory belonging to a directly addressable region by the memory configuration information in the set of control registers; and
   a memory controller coupled between the processor and the memory device, determining the data access address corresponding to the cacheable region or the directly addressable region, selecting only the way in the directly addressable region corresponding to the data access address when the data access address corresponds to the directly addressable region, selecting only the way(s) belonging to the cacheable region when the data access address corresponds to the cacheable region, and having a cache hit detection circuit comprising:
an address register storing the data access address;
a preternined number of tag memories corresponding to the memory ways, storing tag data of the data access address provided by the processor;
a data processing device selectively outputting the tag data or an adjusted tag data as processed data according to a direct address signal; and
a preternined number of address comparators corresponding to the memory ways and coupled to the data processing device, each of the address comparators comparing the processed data with portion bits of the data access address from the address register, and outputting an address match signal as comparison match,
wherein the processor provides the direct address signal indicating that the way is configured as the directly addressable memory, and a cache signal indicating that the way is configured as cache, and
wherein the tag data is adjusted to a preternined address by the data processing device, which is the highest address of memory space of the processor.

2. The memory system as claimed in claim 1, wherein the memory configuration information is encoded value indicating each way of the memory device corresponding to the directly addressable region or the cacheable region.

3. The memory system as claimed in claim 2, further comprising an encoder encoding the memory configuration information.

4. The memory system as claimed in claim 1, wherein the memory configuration information is digital data comprising the first predetermined number of cache size bits, each cache size bit corresponding to one way, and a logic level of the cache size bit is set according to the corresponding way belonging to the directly addressable region or the cacheable region.

5. The memory system as claimed in claim 1, wherein the memory controller comprises a control circuit, which is enabled by a microprocessor memory request provided by the processor, determining the data access address corresponding to the cacheable region or the directly addressable region.

6. The memory system as claimed in claim 5, wherein the control circuit outputs at least one cache enablement signal when the data access address corresponds to the cacheable region, which comprises at least one memory way, and each cache enablement signal is corresponding to one memory way configured as cache memory.

7. The memory system as claimed in claim 5, wherein the memory controller further comprises a cache_hit detection circuit coupled to the control circuit and enabled in response to receipt of a cache enablement signal(s).

8. The memory system as claimed in claim 7, wherein the cache_hit detection circuit comprises:
an address register storing the data access address;
a predetermined number of tag memories corresponding to the memory ways, storing tag data of the data access address provided by the processor in response to receive cache enablement signal(s) in a first clock period, and outputting tag data in a second clock period subsequent to the first clock period; and
a predetermined number of address comparators corresponding to the memory ways, each of them comparing the tag data with portion bits of the data access address from the address register in the second clock period, and outputting an address match signal as comparison match.

9. The memory system as claimed in claim 8, wherein only the tag memory/memories corresponding to the memory way(s) configured as cache memory is/are activated for storing and outputting the tag data, and only the address comparator(s) corresponding to the memory way(s) configured as cache memory is/are activated for comparing the data and outputting the comparison result.

10. The memory system as claimed in claim 8, wherein the tag data comprises other portion bits of the data access address.

11. The memory system as claimed in claim 8, wherein the cache_hit detection circuit further comprises:
a predetermined number of flip flops corresponding to the memory ways, receiving the cache enablement signal(s) in the first clock period and outputting the cache enablement signal(s) in the second clock period; and
a predetermined number of logic circuits corresponding to the memory ways, coupled to the address comparators and the flip flops, outputting a cache_hit signal in response to receipt of the address match signal and the cache enablement signal(s).

12. The memory system as claimed in claim 8, wherein the address comparator is enabled by a comparison enablement signal.

13. The memory system as claimed in claim 12, wherein the cache_hit detection circuit further comprises a predetermined number of flip flops corresponding to the memory ways, coupled to the address comparators, receiving the cache enablement signal(s) in the first clock period and outputting the cache enablement signal(s) as the comparison enablement signal(s) to enable the address comparator(s) in the second clock period.

14. The memory system as claimed in claim 1, wherein the tag data is adjusted to a predetermined address by the data processing device, which will not be accessed by the processor.

15. The memory system as claimed in claim 1, wherein the data processing device comprises an OR logic gate outputting the processed data according to the direct address signal and the tag data.

16. The memory system as claimed in claim 14, wherein the data processing device comprises:
a configuration register storing the predetermined address; and
a multiplexer selectively outputting the tag data or the predetermined address as the processed data according to the direct address signal.

17. A memory access method for accessing a memory device comprising a plurality of entries organized by a first predetermined number of ways, comprising:
providing a data access address, and memory configuration information;
selectively configuring a selected number less than or equal to the first predetermined number of the ways as cache memory belonging to a cacheable region, and configuring remaining ways as directly addressable memory belonging to a directly addressable region by the memory configuration information;
determining the data access address corresponding to the cacheable region or the directly addressable region, selecting only the way in the directly addressable region corresponding to the data access address when the data access address corresponds to the directly addressable region, and selecting only the way(s) belonging to the cacheable region when the data access address corresponds to the cacheable region;

providing a direct address signal indicating that the way is configured as the directly addressable memory, and a cache signal indicating that the way is configured as cache;

storing the data access address;

storing tag data of the data access address;

selectively outputting the tag data or an adjusted tag data as processed data according to the direct address signal; and comparing the processed data with portion bits of the data access address, and outputting an address match signal as comparison match, wherein the adjusted tag data is a pretermined address, which is the highest address of memory space of the processor.

18. The memory access method as claimed in claim 17, wherein the memory configuration information comprises encoded values indicating each way of the memory device corresponding to the directly addressable region or the cacheable region.

19. The memory access method as claimed in claim 17, wherein the memory configuration information is digital data comprising the first predetermined number of cache size bits, each cache size bit corresponding to one way, and a logic level of the cache size bit set according to the corresponding way belonging to the directly addressable region or the cacheable region.

20. The memory access method as claimed in claim 17, wherein at least one cache enablement signal is provided when the data access address corresponds to the cacheable region, which comprises at least one memory way, and each cache enablement signal is corresponding to one memory way configured as cache memory.

21. The memory access method as claimed in claim 20, further comprising:

storing the data access address;

activating tag memory in response to receipt of the cache enablement signal(s) in a first clock period;

outputting the tag data in a second clock period subsequent to the first clock period; and comparing the tag data with portion bits of the stored data access address in the second clock period, and outputting an address match signal as a comparison match.

22. The memory access method as claimed in claim 21, wherein the tag data comprises other portion bits of the data access address.

23. The memory access method as claimed in claim 21, further comprising:

receiving the cache enablement signal(s) in the first clock period and outputting the cache enablement signal(s) in the second clock period; and outputting a cache_hit signal in response to receipt of the address match signal and the cache enablement signal(s).

24. The memory access method as claimed in claim 21, further comprising:

receiving the cache enablement signal(s) in the first clock period and outputting the cache enablement signal(s) to enable the operation of comparing in the second clock period.

25. The memory access method as claimed in claim 17, wherein the tag data is adjusted to a predetermined address by the data processing device, which will not be accessed by the processor.

26. The memory access method as claimed in claim 17, wherein the processed data is generated by performing an OR logic operation on the direct address signal and the tag data.

* * * * *